(12) United States Patent
Sasaki et al.

(10) Patent No.: US 8,346,296 B2
(45) Date of Patent: Jan. 1, 2013

(54) PORTABLE TELEPHONE

(75) Inventors: Koji Sasaki, Kyoto (JP); Atsushi Ito, Kyoto (JP); Tetsuya Ban, Kyoto (JP)

(73) Assignee: J-Data Co., Ltd., Kyoto-shi (JP)

( * ) Notice: Subject to any disclaimer, the term of this patent is extended or adjusted under 35 U.S.C. 154(b) by 1061 days.

(21) Appl. No.: 12/065,231

(22) PCT Filed: Aug. 30, 2006

(86) PCT No.: PCT/JP2006/317117
§ 371 (c)(1),
(2), (4) Date: Feb. 28, 2008

(87) PCT Pub. No.: WO2007/029581
PCT Pub. Date: Mar. 15, 2007

(65) Prior Publication Data
US 2009/0137266 A1 May 28, 2009

(30) Foreign Application Priority Data

Sep. 9, 2005 (JP) ................................. 2005-262156

(51) Int. Cl.
*H04M 1/00* (2006.01)

(52) U.S. Cl. ............... 455/550.1; 455/419; 455/551; 455/187.1; 455/466; 455/574; 379/354; 379/357.04; 379/355.09

(58) Field of Classification Search ............... 455/419, 455/551, 187.1, 466, 574; 379/354, 357.04, 379/355.09
See application file for complete search history.

(56) References Cited

U.S. PATENT DOCUMENTS

| | | | | |
|---|---|---|---|---|
| 7,092,511 B1 * | 8/2006 | Kusaka et al. | ............ | 379/355.09 |
| 7,319,957 B2 * | 1/2008 | Robinson et al. | ............ | 704/252 |
| 7,890,091 B2 * | 2/2011 | Puskoor et al. | ............ | 455/419 |
| 2004/0224675 A1 * | 11/2004 | Puskoor et al. | ............ | 455/419 |
| 2005/0171933 A1 | 8/2005 | Stepanich et al. | | |
| 2007/0207791 A1 | 9/2007 | Sasaki | | |

FOREIGN PATENT DOCUMENTS

CN 1649369 A 8/2005

(Continued)

OTHER PUBLICATIONS

Office Action issued Jan. 26, 2011, in China Patent Application No. 201010247363.7 (with English translation).

(Continued)

*Primary Examiner* — Joseph Arevalo
(74) *Attorney, Agent, or Firm* — Oblon, Spivak, McClelland, Maier & Neustadt, L.L.P.

(57) ABSTRACT

A user enters a numeric string on a standby screen of a cellular telephone, and then presses a predetermined function key, the numeric string obtained by numerical conversion of a piece of registration information, in accordance with an assignment relationship indicated on numerical keys of the cellular telephone. A database in which numeric data obtained by the numerical conversion of a piece of registration information in accordance with the above-mentioned assignment relationship and the piece of registration information are associated with each other is previously held in the cellular telephone. The database is searched by using the entered numeric string as a search key, so that pieces of registration information associated with numeric data containing the numeric string are extracted. An exactly matching one of the extracted pieces of registration information is sorted in a high rank and displayed.

7 Claims, 11 Drawing Sheets

| REGISTERED NAME | NUMERIC DATA | E-MAIL ADDRESS |
|---|---|---|
| ... | ... | . . . |
| Nami | 6264 | nami55@abc.co.jp |
| Nami Nakano | 6264625266 | namin@abc.co.jp |
| Namie Sato | 626437286 | namie@abc.co.jp |
| Namihei Kimura | 6264434546872 | namihei@abc.co.jp |
| Mami | 6264 | mami33@abc.co.jp |
| Mami Ueda | 62648332 | ueda@abc.co.jp |
| Mamiko Fukuda | 626456385832 | mamif@abc.co.jp |
| Chinami Ono | 2446264666 | chi@abc.co.jp |
| Miyuki Namikawa | 64985462645292 | miyuki@abc.co.jp |
| Yukari Nomura | 985274666872 | yukarin@abc.co.jp |
| ... | ... | . . . |

FOREIGN PATENT DOCUMENTS

| | | |
|---|---|---|
| EP | 0 570 116 A1 | 11/1993 |
| EP | 1 193 956 A2 | 4/2002 |
| EP | 1 259 050 A1 | 11/2002 |
| EP | 1 560 403 A1 | 8/2005 |
| GB | 2 369 750 A | 6/2002 |
| JP | 61 107854 | 5/1986 |
| JP | 61-107854 | 5/1986 |
| JP | 4-159841 | 6/1992 |
| JP | 5 158990 | 6/1993 |
| JP | 6-325092 | 11/1994 |
| JP | 2001-257711 | 9/2001 |
| JP | 2003-167822 | 6/2003 |
| JP | 2003 167822 | 6/2003 |
| JP | 03 069459 | 8/2003 |
| WO | WO 98/33111 | 7/1998 |
| WO | WO 99/09729 | 2/1999 |
| WO | WO 03/001778 A1 | 1/2003 |
| WO | WO 03/060772 A1 | 7/2003 |
| WO | WO 2004/025936 A1 | 3/2004 |

OTHER PUBLICATIONS

U.S. Appl. No. 12/353,682, filed Jan. 14, 2009, Sasaki.
Decision of Refusal issued Apr. 25, 2011 in Chinese Patent Application 200680032165.0 (with English translation based on a Japanese translation).
European Office Action issued Jul. 20, 2011, in Patent Application No. 10 156 399.7.
Summons to attend oral proceedings pursuant to Rule 115(1) EPC issued Mar. 28, 2012, in European Patent Application No. 06797089.7.
Office Action mailed Nov. 8, 2011, in Japanese Patent Application No. 2010-038585 (with English-language translation).
Office Action issued May 25, 2012, in Korean Patent Application No. 9-5-2012-030747819, with English and Japanese Translations.
Korean Office Action with English translation based on Japanese translation mailed Oct. 12, 2012, in Patent Application No. 10-2012-7017354.

* cited by examiner

F I G . 5

| NUMERICAL KEY | CORRESPONDING CHARACTER |
|---|---|
| 1 | 1 |
| 2 | 2<br>A、B、C |
| 3 | 3<br>D、E、F |
| 4 | 4<br>G、H、I |
| 5 | 5<br>J、K、L |
| 6 | 6<br>M、N、O |
| 7 | 7<br>P、Q、R、S |
| 8 | 8<br>T、U、V |
| 9 | 9<br>W、X、Y、Z |
| 0 | 0 |

FIG. 6

| REGISTERED NAME | NUMERIC DATA | E-MAIL ADDRESS |
|---|---|---|
| ... | ... | . . . |
| Nami | 6264 | nami55@abc.co.jp |
| Nami Nakano | 6264625266 | namin@abc.co.jp |
| Namie Sato | 626437286 | namie@abc.co.jp |
| Namihei Kimura | 6264434546872 | namihei@abc.co.jp |
| Mami | 6264 | mami33@abc.co.jp |
| Mami Ueda | 62648332 | ueda@abc.co.jp |
| Mamiko Fukuda | 626456385832 | mamif@abc.co.jp |
| Chinami Ono | 2446264666 | chi@abc.co.jp |
| Miyuki Namikawa | 64985462645292 | miyuki@abc.co.jp |
| Yukari Nomura | 985274666872 | yukarin@abc.co.jp |
| ... | ... | . . . |

F I G . 9

45a

| REGISTERED NAME | NUMERIC DATA | E-MAIL ADDRESS |
|---|---|---|
| . . . | . . . | . . . |
| Nami | 6264 | nami55@abc.co.jp |
| Nami Nakano | 6264/625266 | namin@abc.co.jp |
| Namie Sato | 62643/7286 | namie@abc.co.jp |
| Namihei Kimura | 6264434/546872 | namihei@abc.co.jp |
| Mami | 6264 | mami33@abc.co.jp |
| Mami Ueda | 6264/8332 | ueda@abc.co.jp |
| Mamiko Fukuda | 626456/385832 | mamif@abc.co.jp |
| Chinami Ono | 2446264/666 | chi@abc.co.jp |
| Miyuki Namikawa | 649854/62645292 | miyuki@abc.co.jp |
| Yukari Nomura | 985274/666872 | yukarin@abc.co.jp |
| Erika Maria Noda | 37452/62742/6632 | erika@abc.co.jp |
| . . . | . . . | . . . |

PORTABLE TELEPHONE

TECHNICAL FIELD

The present invention is an invention relating to a cellular telephone which stores therein registration information including e-mail addresses of electronic mail, various functions and the like and which calls up the registration information as appropriate to display the registration information on a display part.

BACKGROUND ART

As is well known in the art, cellular telephones which have exhibited a rapid proliferation in recent years have not only a function merely as mobile or portable telephones but also a function as mobile terminal devices. Specifically, it is possible to connect to the Internet through a cellular telephone, and there is a widespread proliferation of sending and receiving pieces of e-mail by using a cellular telephone (See Patent Document 1 as an example). Cellular telephones themselves become more sophisticated in functionality, and various function settings of cellular telephones can be made to suit the preferences of users. Further, cellular telephones incorporating hard disks have been developed in recent years.

For sending a piece of e-mail, for example, from a cellular telephone, it is conventionally common practice to select a desired e-mail address from among a multiplicity of e-mail addresses registered in an address book, thereby determining the selected e-mail address as a destination to which the piece of e-mail is to be sent. To specify the destination of a piece of e-mail, such a process has been widely adopted that a user performs a predetermined manipulation by using dial keys to open an address book, and selects the destination from a displayed list thereof via the dial keys. For function settings of the cellular telephone, such a process has been prevailing that the user performs a predetermined manipulation by using the dial keys to follow a menu screen, selects a necessary item from a menu, and performs a setting manipulation.

Patent Document 1: Japanese Patent Application Laid-Open No. 2001-257711

In the above-mentioned manner, the manipulations of calling up registration information (registered e-mail addresses and functions) to make a selection are very often performed on the cellular telephone. However, the number of dial keys that can be arranged on the cellular telephone is limited to approximately twenty at most because of size limitations, and the user manipulates the approximately twenty keys to make a selection from among various pieces of registration information and to set the various pieces of registration information. Thus, the operability of cellular telephones is much inferior to that of personal computers and the like each having a keyboard and a mouse, and there has been a problem such that the more sophisticated the functionality of cellular telephones becomes, the more cumbersome the operability for calling up the registration information inevitably becomes.

DISCLOSURE OF THE INVENTION

The present invention is intended for a cellular telephone which calls up registration information including an e-mail address, a function and the like to display the registration information on a display part.

According to the present invention, there is an assignment relationship established between each numerical key included among dial keys of the cellular telephone and a plurality of single characters. The cellular telephone comprises: a storage part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string; a sorting part for rearranging an exactly matching one of the pieces of registration information extracted by said extraction part in a high rank; and a display control part for controlling said display part so as to display the pieces of registration information extracted by said extraction part in the order rearranged by said sorting part.

A user can easily call up a desired piece of registration information only by entering a relatively short numeric string obtained by the numerical conversion of the desired piece of registration information in accordance with the assignment relationship. Additionally, an exactly matching one of the extracted pieces of registration information is rearranged in a high rank and is then displayed. This allows more efficient display of pieces of registration information truly desired by the user.

According to one aspect of the present invention, there is an assignment relationship established between each numerical key included among dial keys of the cellular telephone and a plurality of single characters. The cellular telephone comprises: a first storage means part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string; a second storage part for storing the number of times a user selected a piece of registration information in the past as frequency information; a sorting part for rearranging at least one of the pieces of registration information extracted by said extraction part which was selected in the past in a high rank by referencing said frequency information; and a display control part for controlling said display part so as to display the pieces of registration information extracted by said extraction part in the order rearranged by said sorting part.

A user can easily call up a desired piece of registration information only by entering a relatively short numeric string obtained by the numerical conversion of the desired piece of registration information in accordance with the assignment relationship. Additionally, at least one of the extracted pieces of registration information which was selected in the past is rearranged in a high rank and is then displayed. This allows more efficient display of pieces of registration information truly desired by the user.

According to another aspect of the present invention, there is an assignment relationship established between each numerical key included among dial keys of the cellular telephone and a plurality of single characters. The cellular telephone comprises: a storage part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string; and a display control part for displaying the pieces of registration information extracted by said extraction part on said display part, wherein said acceptance part accepts the entry of a numeric string including a wild card.

The entry of a numeric string including the wild card is accepted. This allows pieces of registration information truly desired by the user to be easily called up and efficiently displayed.

According to another aspect of the present invention, there is an assignment relationship established between each numerical key included among dial keys of the cellular telephone and a plurality of single characters. The cellular telephone comprises: a storage part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string; and a display control part for displaying the pieces of registration information extracted by said extraction part on said display part, wherein numeric data including a character delimiter corresponding to a blank character contained in a piece of registration information is registered in said database, and wherein said extraction part performs a prefix search also on numeric data subsequent to the character delimiter.

The numeric data including the character delimiter corresponding to a blank character contained in a piece of registration information is registered in the database, and the prefix search is also performed on the numeric data subsequent to the character delimiter. This allows pieces of registration information desired by the user to be easily called up and efficiently displayed.

According to another aspect of the present invention, there is an assignment relationship established between each numerical key included among dial keys of the cellular telephone and a plurality of single characters. The cellular telephone comprises: a storage part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string; and a display control part for controlling said display part so that when the number of pieces of registration information extracted by said extraction part is not greater than a predetermined number, one or each piece of registration information extracted by said extraction part is displayed on said display part with a selection parameter regarding the one or each extracted piece of registration information added thereto.

When the number of extracted pieces of registration information is not greater than the predetermined number, one or each extracted piece of registration information is displayed with the selection parameter regarding the one or each extracted piece of registration information added thereto. This allows more efficient display of pieces of registration information desired by the user.

According to another aspect of the present invention, there is an assignment relationship established between each numerical key included among dial keys of the cellular telephone and a plurality of single characters. The cellular telephone comprises: a storage part for storing a database in which numeric data obtained by numerical conversion of a piece of registration information in accordance with said assignment relationship and said piece of registration information are associated with each other; an acceptance part for accepting a numeric string entered by using said dial keys as a call request for a predetermined piece of registration information; an extraction part for searching said database to extract pieces of registration information associated with numeric data containing said numeric string on a category-by-category basis; and a display control part for controlling said display part so as to display at least one of the pieces of registration information extracted by said extraction part which belongs to a previously determined default category, and so as to display at least one of the pieces of registration information extracted by said extraction part which belongs to a category different from said default category in response to a predetermined key manipulation.

At least one of the extracted pieces of registration information which belongs to the previously determined default category is displayed, and at least one of the extracted pieces of registration information which belongs to a category different from the default category is displayed in response to a predetermined key manipulation. This allows more efficient display of pieces of registration information desired by the user.

It is therefore an object of the present invention to provide a cellular telephone which is capable of easily calling up a piece of registration information desired by a user and which is also capable of efficiently displaying the piece of registration information.

BRIEF DESCRIPTION OF DRAWINGS

FIG. 5 is a chart showing an assignment relationship between numerical keys and characters;

FIG. 6 is a chart showing an example of a registration information database;

FIG. 9 is a chart showing another example of the registration information database;

BEST MODES FOR CARRYING OUT THE INVENTION

Preferred embodiments according to the present invention will now be described in detail with reference to the drawings.

<1. First Preferred Embodiment>

Figure 1:
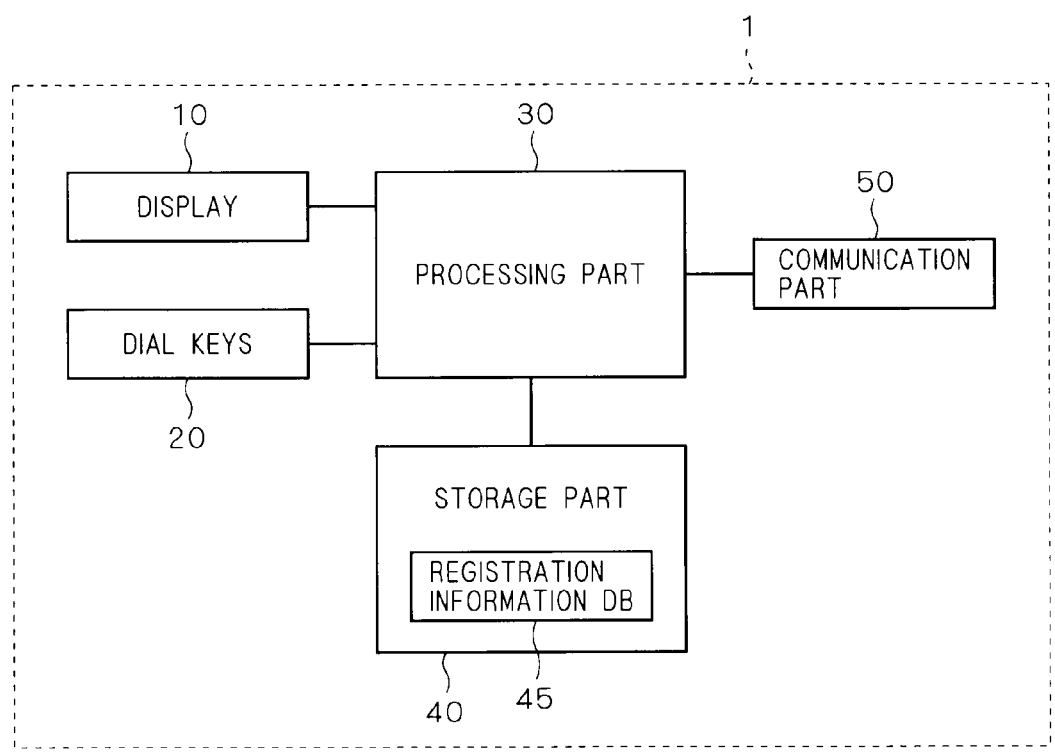
FIG. 1 is a block diagram showing a functional construction of a cellular telephone according to the present invention.

FIG. 1 is a block diagram showing a functional construction of a cellular telephone according to the present invention. A cellular telephone 1 includes a display 10, dial keys 20, a processing part 30, a storage part 40 and a communication part 50. The display 10 is a liquid crystal display, and displays various pieces of information and content. The dial keys 20 are input keys for a user to perform a manipulation on the cellular telephone 1. The dial keys 20 include numerical keys and function keys. The processing part 30 is constructed using a CPU for performing a computation process, and executes various processes in accordance with a predetermined program.

The storage part 40 is constructed using a memory for storing data therein. A registration information database (DB) 45 to be described later is stored in this storage part 40. The storage part 40 may be constructed using a hard disk. The communication part 50 is constructed using a telecommunication circuit, and establishes communication with a base station. The display 10, the dial keys 20 and the storage part 40 perform predetermined operations under the control of the processing part 30. The cellular telephone 1 is further provided with an antenna, a microphone, a speaker, a battery, a CCD and the like in addition to the above.

Figure 2:
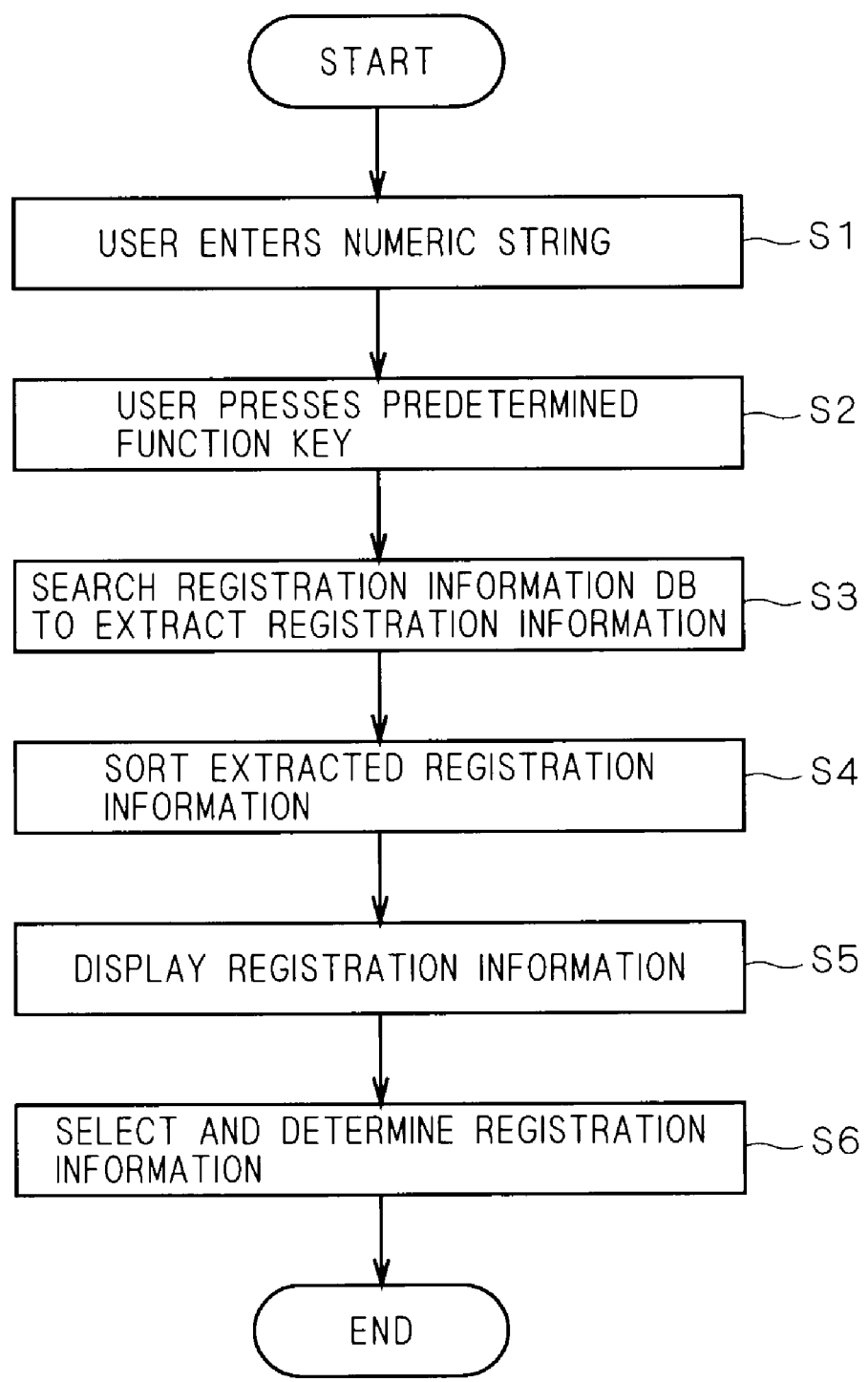
FIG. 2 is a flow chart showing an operational procedure in the cellular telephone.
Figure 3:
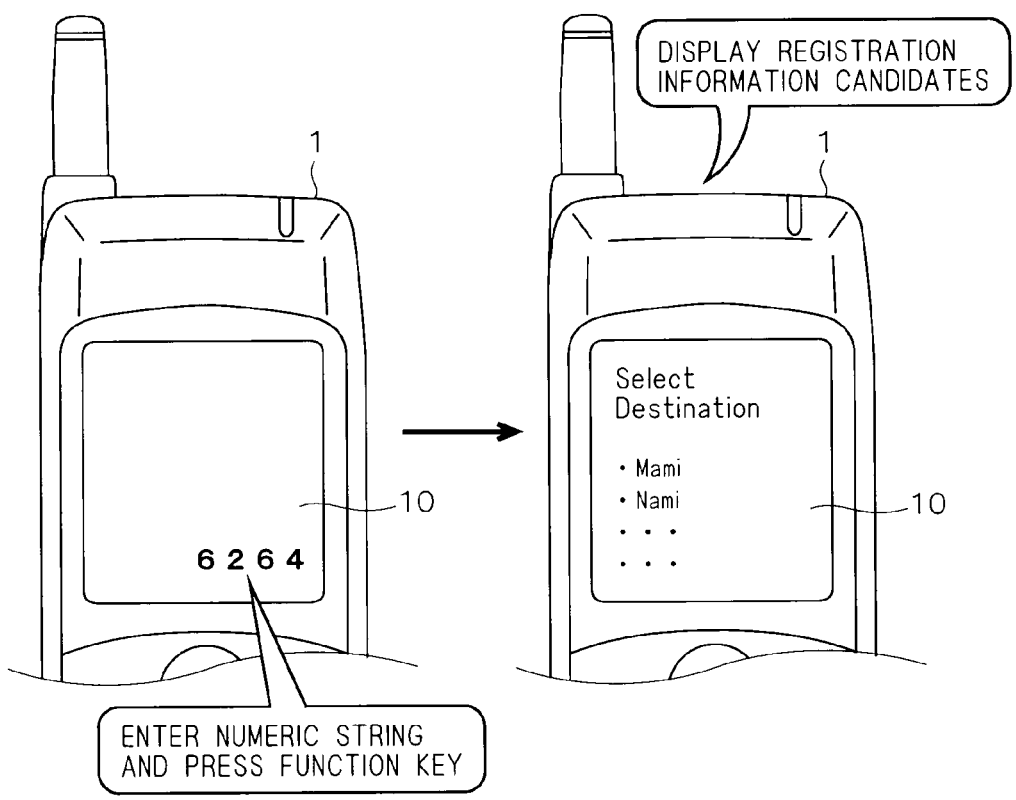
FIG. 3 is a view showing a display transition on a display of the cellular telephone in response to the progress of the processing procedure of FIG. 2.

FIG. 2 is a flow chart showing an operational procedure in the cellular telephone 1. FIG. 3 is a view showing a display transition on the display 10 of the cellular telephone 1 in response to the progress of the processing procedure of FIG. 2. A procedure for calling up an e-mail address of a destination when a user sends a piece of e-mail by using the cellular telephone 1 is taken herein as an example for description.

First, the user enters a numeric string by using the dial keys 20 of the cellular telephone 1 (in Step S1), the numeric string being obtained by numerical conversion of a piece of registration information (in this example, a registered destination name and an e-mail address of a piece of e-mail). In this preferred embodiment, the user directly enters the numeric string on a standby screen of the cellular telephone 1. The numeric string obtained by the numerical conversion of a piece of registration information is that obtained by the numerical conversion of a registered destination name of a piece of e-mail desired by the user under the following rules.

Figure 4:
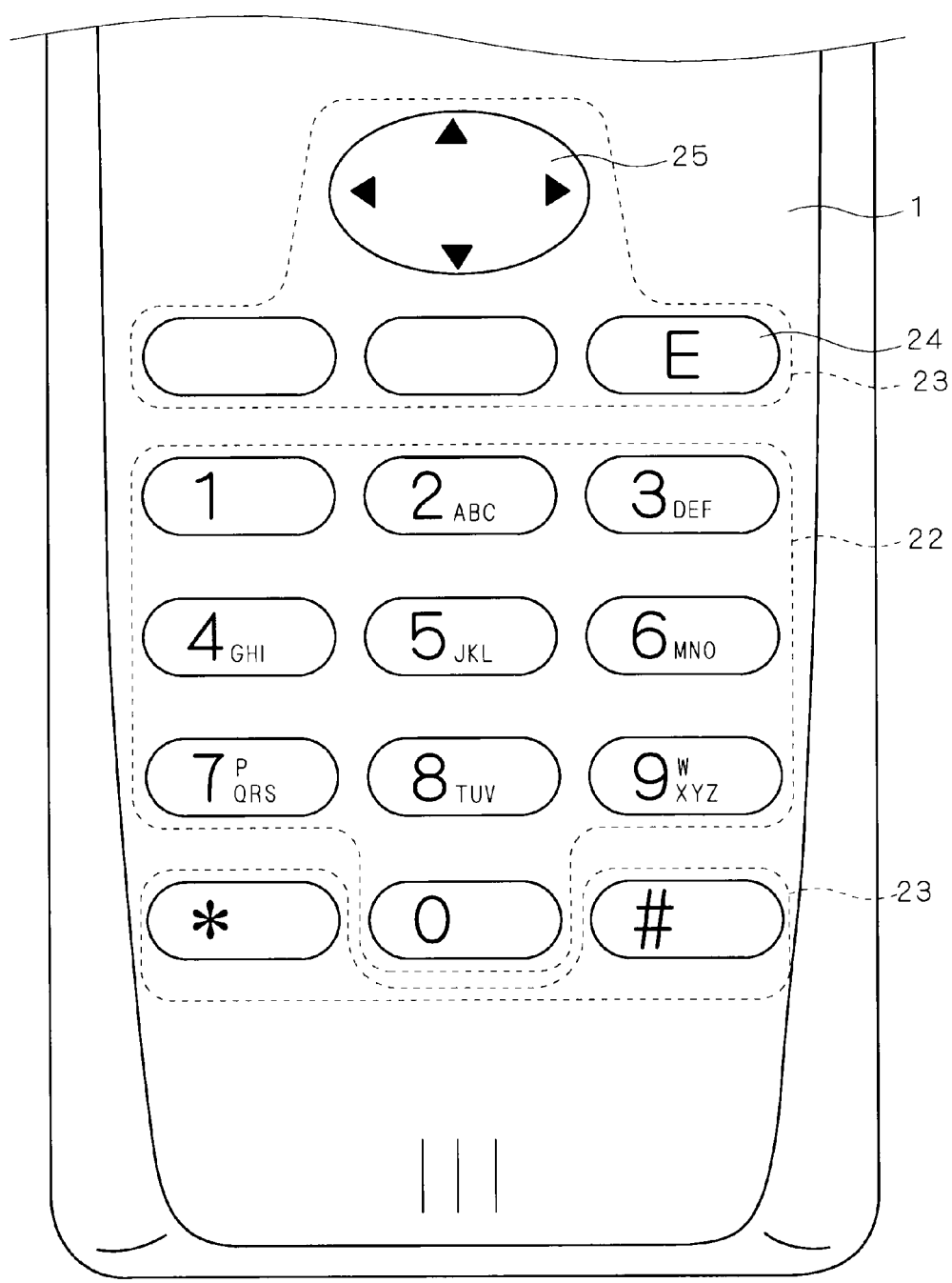
FIG. 4 is a view illustrating a typical arrangement of dial keys of the cellular telephone.

Specifically, the dial keys 20 for most cellular telephones include numerical keys (a so-called ten-digit keypad) and function keys (for example, a "*" key and a "#"key). FIG. 4 is a view illustrating a typical arrangement of the dial keys of the cellular telephone 1. The dial keys 20 of the cellular telephone 1 in this preferred embodiment include ten numerical keys 22, and function keys 23 including the "*" key, the "#" key, an E-mail key 24 and a direction key 25. Of these keys, each of the numerical keys 22 is labeled with not only a corresponding numerical character but also alphabetical characters. This is intended to allow the entry of letters in the cellular telephone 1 on which only a limited number of keys can be arranged, as is well known. To enter the letter "K" as an example, the user usually places the cellular telephone 1 into a letter entry mode and presses the "5" key twice.

In this preferred embodiment, an assignment relationship as shown in FIG. 5 is established between each of the ten numerical keys 22 and a plurality of single characters. Specifically, a numerical character and single alphabetical characters (including both uppercases and lowercases) indicated on each numerical key are assigned to each of the ten numerical keys 22. Of the numerical keys 22, the "7" key as an example is labeled with the numerical character "7" and the alphabetical characters "PQRS." The numerical character "7" and the alphabetical characters "P, Q, R, S" are assigned to the "7" key. Of the numerical keys 22, the "1" key is labeled with only the numerical character "1." Only the numerical character "1" is assigned to the "1" key. A hyphen "-" in addition to the numerical character "0" is assigned to the "0" key.

Although a numerical character and single alphabetical characters are assigned to each numerical key in the example of FIG. 5, the assignment relationship is not limited to this, but assignment relationships may be established in accordance with respective languages in various countries. For example, single Japanese kana characters may be assigned to each numerical key, or single Greek letters may be assigned to each numerical key.

The user enters a numeric string on the standby screen of the cellular telephone 1 by using the dial keys 20, the numeric string being obtained by the numerical conversion of a registered destination name of a desired piece of e-mail in accordance with the above-mentioned assignment relationship shown in FIG. 5. For example, a user who desires to send a piece of e-mail to "Nakano Nami (first name: Nami, and family name: Nakano)" enters "6264625266" which is obtained by the numerical conversion of the registered destination name "Nami Nakano" in accordance with the above-mentioned assignment relationship. A user who desires to send a piece of e-mail to "Ono Chinami (first name: Chinami, and family name: Ono)" enters "2446264666" which is obtained by the numerical conversion of the registered destination name "Chinami Ono." It is not always necessary to enter a numeric string obtained by the numerical conversion of all characters of a registered destination name, but the numeric string "2446264" obtained by the numerical conversion of, for example, only "Chinami" from "Chinami Ono" may be entered.

Next, the procedure proceeds to Step S2 in which the user who has directly entered the numeric string on the standby screen of the cellular telephone 1 presses a predetermined function key, e.g. the E-mail key 24 (See FIG. 4). When a numeric string is entered on the standby screen and the E-mail key 24 is pressed, the processing part 30 judges that this indicates a call request for an e-mail address using the numeric string as a search key. Then, the processing part 30 searches the registration information database 45 held in the storage part 40 by using the numeric string as a search key to retrieve or extract a piece of registration information (in this case, a registered destination name and an e-mail address) associated with numeric data containing the numeric string (in Step S3). The numeric data in this preferred embodiment is that obtained by the numerical conversion of a registered destination name of a piece of e-mail in accordance with the assignment relationship of FIG. 5. Numeric data obtained by the numerical conversion of a registered destination name of a piece of e-mail in accordance with the assignment relationship of FIG. 5 and an e-mail address to which the piece of e-mail is to be sent are stored in association with each other in the registration information database 45 held in the storage part 40.

FIG. 6 is a chart showing an example of the registration information database 45. This registration information database 45 serves as a so-called address book database. In the registration information database 45 shown in FIG. 6, a registered destination name and its numeric data are associated with an e-mail address for each destination. The numeric data used herein is that obtained by the numerical conversion of a registered destination name serving as the registration information in accordance with the assignment relationship of FIG. 5. For "Nakano Nami" which is one of the destinations as an example, the registered destination name "Nami Nakano," the numeric data "6264625266" obtained by the numerical conversion thereof in accordance with the assignment relationship of FIG. 5, and "namin@abc.co.jp" which is an e-mail address of "Nakano Nami" are associated with each other. For "Ueda Mami (first name: Mami, and family name: Ueda)" which is another destination, the registered destination name "Mami Ueda," the numeric data "62648332" obtained by the numerical conversion thereof in accordance with the assignment relationship of FIG. 5, and "ueda@abc.co.jp" which is an e-mail address of "Ueda Mami" are associated with each other.

The registration information database 45 is created in such a manner that when the user registers a new e-mail address, the processing part 30 automatically creates numeric data from a registered destination name in accordance with the above-mentioned assignment relationship, and registers the registered name, the numeric data and the e-mail address in association with each other in the registration information database 45. That is, when accepting a new piece of registration information (in this example, a registered destination name and an e-mail address), the processing part 30 registers the numeric data obtained by the numerical conversion of the registered destination name included in the piece of registration information in accordance with the assignment relationship of FIG. 5, and the e-mail address in association with each other in the registration information database 45. The user does not always enter a full name as the registered destination name, but sometimes enters a name identifiable by the user himself/herself, e.g. only a first name or a nickname. For example, there is a line in which only the first name "Mami" is entered as the registered destination name also in FIG. 6. In such a case, the processing part 30 associates the numeric data "6264" obtained by the numerical conversion of the registered destination name "Mami" with the registered destination name "Mami" and the e-mail address "mami33@abc.co.jp."

When a numeric string is entered on the standby screen and the E-mail key 24 is pressed, the processing part 30 searches the registration information database 45 as shown in FIG. 6 to retrieve or extract a registered destination name and an e-mail address which are associated with numeric data containing the numeric string. For example, when the user enters the numeric string "6264" on the standby screen and then presses the E-mail key 24, the processing part 30 searches a numeric data field of the registration information database 45 to retrieve or extract a registered destination name and an e-mail address which are associated with numeric data containing "6264."

In searching the registration information database 45 for numeric data containing a predetermined numeric string, the processing part 30 performs an exact match search and a partial match search in the first preferred embodiment. When the exact match search is performed using the numeric string "6264" as a search key, the registered destination names "Nami" and "Mami" and the e-mail addresses corresponding thereto are retrieved or extracted in the example of FIG. 6. When the partial match search is performed using the numeric string "6264" as a search key, on the other hand, the registered destination names "Nami Nakano," "Namie Sato," "Namihei Kimura," "Mami Ueda," "Mamiko Fukuda," "Chinami Ono" and "Miyuki Namikawa" in addition to "Nami" and "Mami," and the e-mail addresses corresponding thereto are retrieved or extracted in the example of FIG. 6.

Subsequently, the procedure proceeds to Step S4 in which the processing part 30 performs a sorting process on extracted pieces of registration information. In the first preferred embodiment, the processing part 30 performs the sorting process for rearranging an exactly matching one of the extracted pieces of registration information in a high rank. In the above-mentioned example, for instance, the rearrangement is done so that the registered destination names "Nami" and "Mami" which exactly match the numeric string "6264" serving as the search key are in high ranks, whereas the registered destination names "Nami Nakano," "Namie Sato," "Namihei Kimura," "Mami Ueda," "Mamiko Fukuda," "Chinami Ono" and "Miyuki Namikawa" which only partially match the numeric string "6264" serving as the search key are in low ranks. The registered destination names exactly matching the numeric string and the registered destination names partially matching the numeric string may be sorted in the respective groups, for example, in the order of character codes.

After the completion of the sorting process, the procedure proceeds to Step S5 in which the processing part 30 displays the extracted pieces of registration information in the rearranged order on the display 10. For example, when the user enters the numeric string "6264" on the standby screen and presses the E-mail key 24 as described above, the registered destination names "Nami" and "Mami" exactly matching the numeric string are first displayed in high ranks, and the registered destination names only partially matching the numeric string are then displayed thereafter in the order of character codes (See FIG. 3). Subsequently, the procedure proceeds to Step S6 in which the user who has viewed the displayed destination candidates selects a desired piece of registration information to determine the selection as a destination. As a result, the e-mail address of the destination is selected and called up.

In the above-mentioned manner, the user can retrieve a desired destination from an address book only by entering a numeric string obtained by the numerical conversion of a registered destination name desired as a destination of a piece of e-mail in accordance with the assignment relationship of FIG. 5 on the standby screen of the cellular telephone 1 and then pressing the E-mail key 24, and can specify the destination of the piece of e-mail easily by making a selection from among candidates therefor.

Conventionally, when a user sends a piece of e-mail, it has been a common practice to open an address book once by performing a predetermined manipulation and to make a selection from among a multiplicity of e-mail addresses registered therein. However, in a manner as described in this preferred embodiment, the user can enter a numeric string readily as if the user entered a telephone number to easily retrieve a destination. Additionally, the assignment relationship as shown in FIG. 5 already conforms to the characters indicated on the numerical keys of typical cellular telephones, so that the user can enter a numeric string obtained by the numerical conversion of a piece of registration information without feeling much uncomfortable.

Further, since a plurality of characters are assigned to each numerical character constituting the numeric string serving as a search key, the above-mentioned search becomes a kind of fuzzy search, and a considerable number of hits, i.e. a considerable number of pieces of registration information, are obtained when the partial match search is also performed. Of these, there are many hits having nothing to do with a desired piece of registration information. Such a tendency to pick up pieces of registration information having nothing to do with a desired one becomes more pronounced as the number of digits of the numeric string serving as a search key decreases. Thus, the technique as in the first preferred embodiment is adapted to display the pieces of registration information after performing the sorting process of rearranging an exactly matching one of the pieces of registration information in a high rank. This allows more efficient display of pieces of registration information truly desired by the user.

<2. Second Preferred Embodiment>

Next, a second preferred embodiment according to the present invention will be described. The construction of the cellular telephone and the fundamental operational procedure thereof according to the second preferred embodiment are similar to those of FIGS. 1 and 2 described according to the first preferred embodiment. The second preferred embodiment differs from the first preferred embodiment only in that an exactly matching one of the extracted pieces of registration information is placed in the first rank, a prefix-matching one thereof is placed in the second rank and a partially matching one thereof is placed in the third rank in the sorting process of Step S4.

Specifically, according to the second preferred embodiment, when the processing part 30 searches the registration information database 45 for numeric data containing a predetermined numeric string (in Step S3), the processing part 30 performs a prefix search in addition to the exact match search and the partial match search. The processing part 30 performs a sorting process such that an exactly matching one of the extracted pieces of registration information is placed in the first rank, a prefix-matching one thereof is placed in the second rank and a partially matching one thereof is placed in the third rank, in the sorting process of Step S4. For example, when the registration information database 45 is as shown in FIG. 6, the rearrangement is done so that the registered destination names "Nami" and "Mami" exactly matching the numeric string "6264" serving as the search key are in the first rank, the registered destination names "Nami Nakano," "Namie Sato," "Namihei Kimura," "Mami Ueda" and "Mamiko Fukuda" not exactly matching but prefix-matching the numeric string are in the second rank, and the registered destination names "Chinami Ono" and "Miyuki Namikawa" only partially matching the numeric string are in the third rank.

Figure 7:
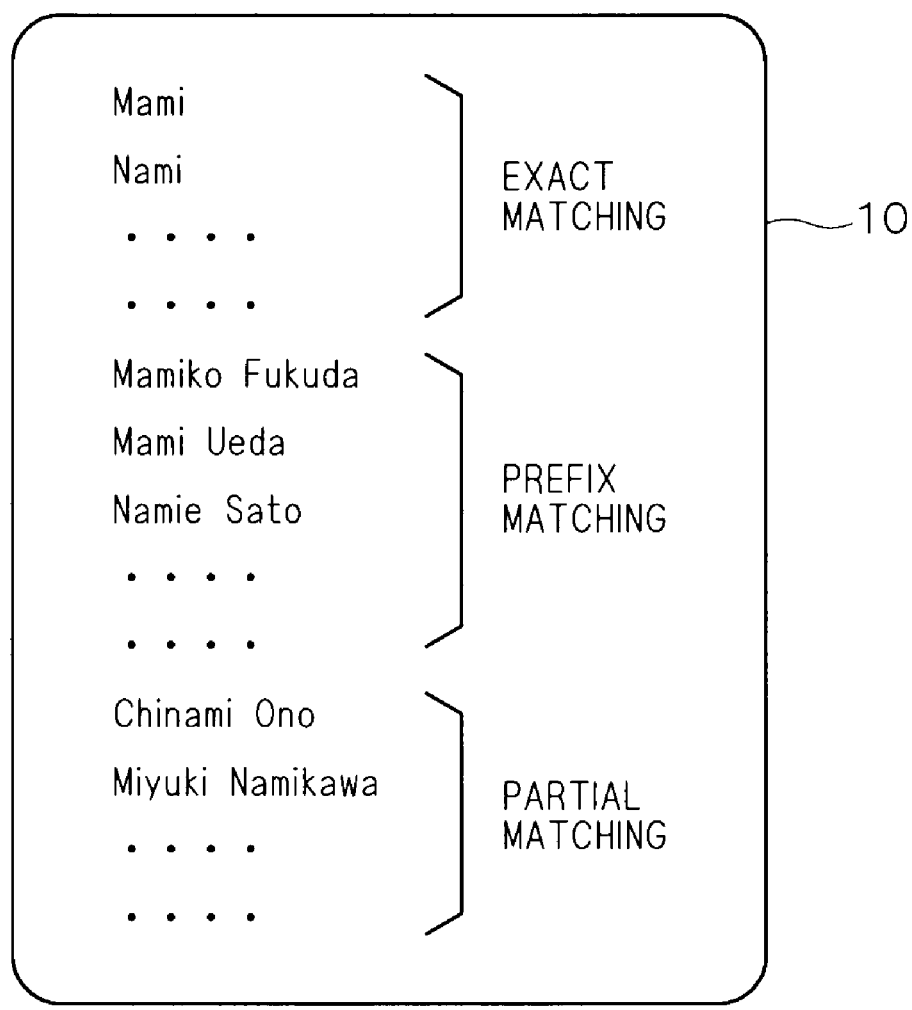
FIG. 7 is a view showing an example of display according to a second preferred embodiment.

After the completion of the sorting process, the processing part 30 displays the extracted pieces of registration information in the rearranged order on the display 10 of the cellular telephone 1. As a result, a display as shown in FIG. 7 is produced on the display 10. When the user enters the numeric string "6264" on the standby screen and presses the E-mail key 24, a group of pieces of registration information exactly matching the numeric string are first displayed, pieces of registration information not exactly matching but prefix-matching the numeric string are displayed as the subsequent group, and a group of pieces of registration information only partially matching the numeric string are finally displayed.

This produces effects similar to those of the first preferred embodiment, and additionally allows more efficient display of pieces of registration information truly desired by the user.

<3. Third Preferred Embodiment>

Figure 8:
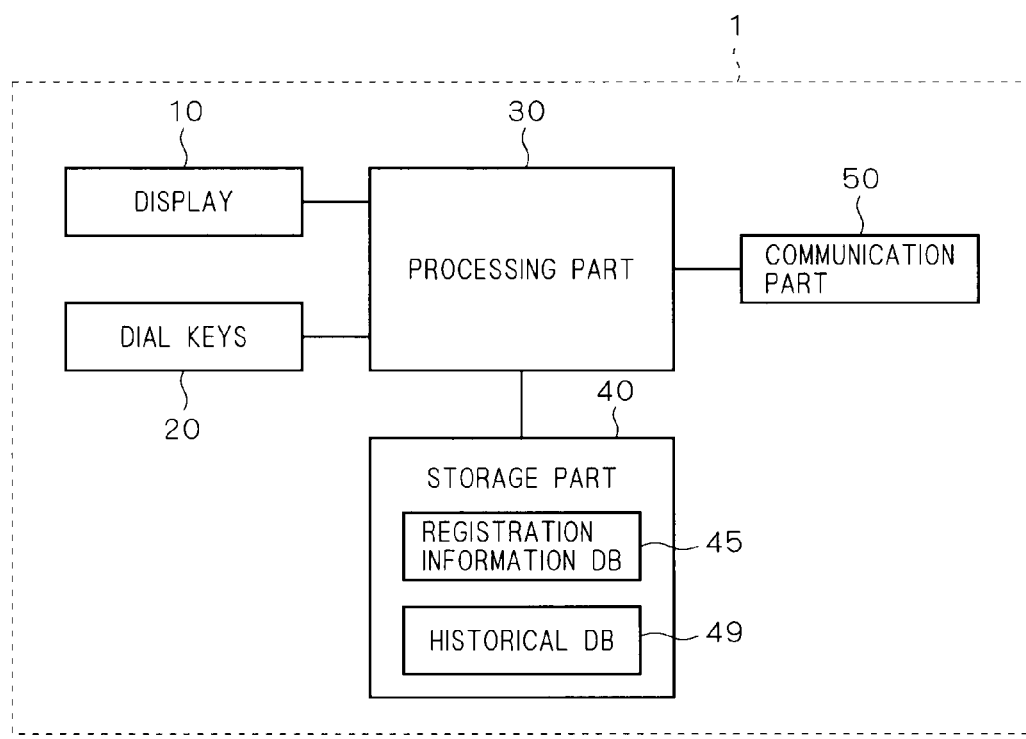
FIG. 8 is a block diagram showing another example of the functional construction of the cellular telephone.

Next, a third preferred embodiment according to the present invention will be described. FIG. 8 is a block diagram showing the functional construction of the cellular telephone 1 according to the third preferred embodiment. The cellular telephone 1 according to the third preferred embodiment differs from that according to the first preferred embodiment in that a historical database 49 in addition to the registration information database 45 is stored in the storage part 40.

The number of times the user selected a piece of registration information in the past is registered as frequency information in the historical database 49. For example, when the registration information database 45 is as shown in FIG. 6 and the user selected the registered destination name "Namie Sato" fifteen times in the past, the registered designation name "Namie Sato" which is a piece of registration information and the number of times of the selection "15" are registered in association with each other in the historical database 49.

The fundamental operational procedure of the cellular telephone 1 according to the third preferred embodiment is similar to that shown in FIG. 2. The processing part 30, however, performs the sorting process of referencing the frequency information registered in the historical database 49 to rearrange at least one of the extracted pieces of registration information which was selected in the past in a high rank in the sorting process of Step S4 according to the third preferred embodiment. At this time, a piece of registration information which was selected a greater number of times in the past is rearranged in a higher rank. As an example, when the registered destination name "Namie Sato" was selected fifteen times in the past and the registered destination name "Nami Nakano" was selected eleven times in the past, the registered destination name "Namie Sato" is rearranged in a rank higher than that of the registered destination name "Nami Nakano."

After the completion of the sorting process, the processing part 30 displays the extracted pieces of registration information in the rearranged order on the display 10 of the cellular telephone 1. In this manner, a piece of registration information which was selected by a user a greater number of times, that is, which was called up more frequently in the past is rearranged in a higher rank. This allows more efficient display of pieces of registration information truly desired by the user.

The sorting of the third preferred embodiment in which the frequency information is referenced and the sorting of the first and second preferred embodiments may be combined together. Specifically, a piece of registration information which was selected a greater number of times in each of the group of pieces of registration information exactly matching a numeric string serving as a search key, the group of pieces of registration information not exactly matching but prefix-matching the numeric string and the group of pieces of registration information only partially matching the numeric string is rearranged in a higher rank. For example, when the registered destination name "Nami" was selected a greater number of times, i.e. more frequently, of the two registered destination names "Nami" and "Mami" exactly matching the numeric string "6264" serving as a search key, the registered destination name "Nami" is rearranged in a higher rank than that of the registered destination name "Mami." However, even when the registered destination name "Nami Nakano" prefix-matching the numeric string "6264" serving as the search key was selected a greater number of times than the registered destination name "Mami" exactly matching the numeric string, the registered destination name "Nami Nakano" is not rearranged in a higher rank than that of the registered destination name "Mami." In other words, a higher priority is given to the judgment on matching than to the judgment based on the frequency information.

A predetermined threshold value may be introduced into the judgment on the frequency information so that a piece of registration information is brought into the sorting in a group of pieces of registration information in a higher rank when the number of times the piece of registration information was selected in the past is not less than the threshold value. In the above-mentioned example, for instance, when the number of times the registered destination name "Nami Nakano" prefix-matching the numeric string "6264" was selected is not less than the predetermined threshold value, the registered destination name "Nami Nakano" may be brought into the group of pieces of registration information exactly matching the numeric string, and the sorting process based on the frequency information be performed in the exactly matching group.

<4. Fourth Preferred Embodiment>

Next, a fourth preferred embodiment according to the present invention will be described. The construction of the cellular telephone according to the fourth preferred embodiment is similar to that according to the first preferred embodiment shown in FIG. 1. The operational procedure of the cellular telephone according to the fourth preferred embodiment is substantially similar to that shown in FIG. 2. However, the sorting process of Step S4 is not performed in the fourth preferred embodiment.

In the fourth preferred embodiment, the entry of a numeric string including a wild card may be made when the entry of a numeric string by using the dial keys 20 is accepted. For example, if the user forgets whether he/she registered the registered destination name as "Mamiko Fukuda" or "Mamiko Hukuda" when he/she registered an e-mail address of "Fukuda (or Hukuda) Mamiko (first name: Mamiko, and family name: Fukuda (or Hukuda))" in the cellular telephone 1, he/she enters the numeric string "626456*85832" by using the dial keys 20 and presses the E-mail key 24. The subsequent search and retrieval (extraction) processes are performed on the assumption that the wild card "*" specifies any numerical character in the range of 0 to 9. Thus, the registered destination name is always extracted, no matter whether the registered destination name is "Mamiko Fukuda" or "Mamiko Hukuda."

This also allows pieces of registration information truly desired by the user to be easily called up and efficiently displayed. This is particularly convenient when the correct spelling or characters of the registered information are uncertain. The wild card is not limited to "*" but may be, for example, "#" or the like.

<5. Fifth Preferred Embodiment>

Next, a fifth preferred embodiment according to the present invention will be described. The construction of the cellular telephone according to the fifth preferred embodiment is similar to that according to the first preferred embodiment shown in FIG. 1. The operational procedure of the cellular telephone according to the fifth preferred embodiment is substantially similar to that shown in FIG. 2. However, the sorting process of Step S4 is not performed in the fifth preferred embodiment.

A registration information database 45a stored in the storage part 40 is constructed as shown in FIG. 9 according to the fifth preferred embodiment. The registration information database 45a differs from FIG. 6 in that numeric data including a character delimiter "/" corresponding to a blank character (or a space) contained in a piece of registration information registered by the user is registered in the registration information database 45a. For the registered destination name "Erika Maria Noda" as an example, the numeric data "37452/62742/6632" and the e-mail address "erika@abc.co.jp" are associated with each other. Specifically, when the user registers the new e-mail address, the processing part 30 automatically assigns the character delimiter "/" to the blank character included in the registered destination name to create numeric data, and registers the registered destination name, the numeric data and the e-mail address in association with each other in the registration information database 45a. The character delimiter is not limited to "/", but other characters, e.g. the blank character (or the space), may be used as they are.

Then, when the process of retrieving or extracting a piece of registration information is performed by searching the registration information database 45a as shown in FIG. 9, the prefix search is performed also on numeric data subsequent to the character delimiter "/." Thus, for the numeric data "37452/62742/6632" as an example, the prefix search is performed on "37452," "62742" and "6632." A specific technique for the execution of such a prefix search is such that an additional index database in which, for example, a plurality of numeric data ("37452," "62742" and "6632" in the above-mentioned example) delimited with the character delimiter "/" are individually registered is provided in the storage part 40, and the prefix search is performed in the index database.

In this manner, even when the user enters a numeric string obtained by the numerical conversion of any one of "Erika," "Maria" and "Noda" included in the registered destination name "Erika Maria Noda" in accordance with the assignment relationship of FIG. 5 during the execution of a search or when the user enters a numeric string obtained by the numerical conversion of, for example, "MariaNo" in an unfinished manner, the processing part 30 can extract the registered destination name "Erika Maria Noda" desired by the user to display the same on the display 10.

It is passably possible to carry out similar extraction and display by performing the partial match search on the registration information database 45 as shown in FIG. 6. However, the partial match search performed in a fuzzy search such that a plurality of characters are assigned to each numerical character constituting the numeric string serving as a search key results in the pickup of an enormous amount of registration information having nothing to do with a piece of registration information desired by the user, and also results in prolonged search time. In this regard, the technique as described in the fifth preferred embodiment reduces the amount of extracted registration information having noting to do with the desired piece of registration information as compared with that obtained by the partial match search, and also shortens the search time. As a result, this allows more efficient display of pieces of registration information truly desired by the user.

<6. Sixth Preferred Embodiment>

Figure 10:
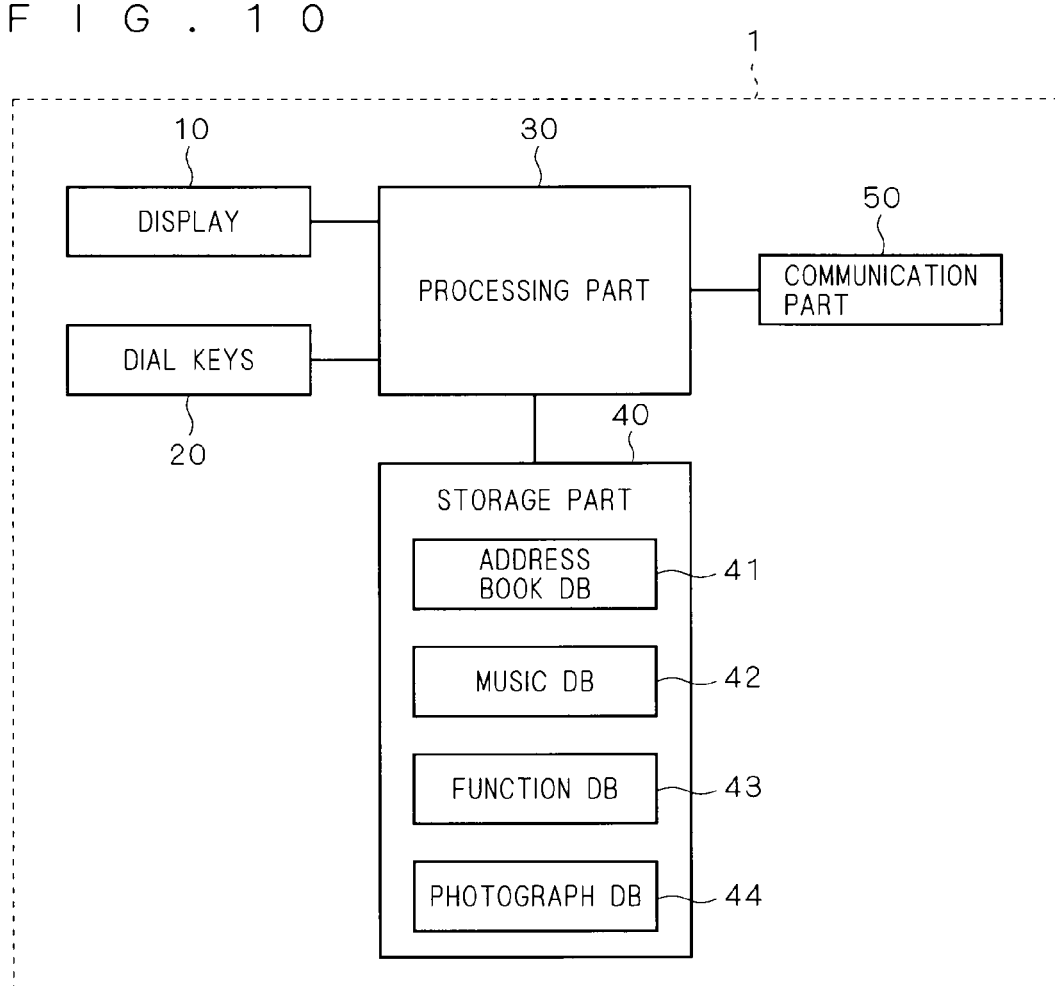
FIG. 10 is a block diagram showing another example of the functional construction of the cellular telephone.

Next, a sixth preferred embodiment according to the present invention will be described. FIG. 10 is a block diagram showing the functional construction of the cellular telephone 1 according to the sixth preferred embodiment. The cellular telephone 1 according to the sixth preferred embodiment differs from that according to the first preferred embodiment in that four registration information databases, i.e. an address book database 41, a music database 42, a function database 43 and a photograph database 44, are stored in the storage part 40.

The address book database 41 is a database in which an e-mail address of a piece of e-mail, a registered destination name thereof and numeric data obtained by numerical conversion of the registered destination name in accordance with the assignment relationship of FIG. 5 are registered in association with each other, and is a database similar to that shown in FIG. 6. The music database 42 is a database in which a file name of an MP3 music file and the like, a song title thereof, and numeric data obtained by numerical conversion of the song title in accordance with the assignment relationship of FIG. 5 are registered in association with each other. The function database 43 is a database in which a file name for the execution of a function incorporated in the cellular telephone 1, a function name thereof, and numeric data obtained by numerical conversion of the function name in accordance with the assignment relationship of FIG. 5 are registered in association with each other. Further, the photograph database 44 is a database in which a file name of a photograph and the like taken with a built-in CCD camera, a title of the photograph, and numeric data obtained by numerical conversion of the title in accordance with the assignment relationship of FIG. 5 are registered in association with each other. Each of the registration information databases is constructed in a format similar to that of FIG. 6. Of the above-mentioned four registration information databases, three databases, i.e. the address book database 41, the music database 42 and the photograph database 44, are constructed by the registration from the user of the cellular telephone 1, and the function database 43 is incorporated in the cellular telephone 1 when the cellular telephone 1 is originally manufactured.

Further, according to the sixth preferred embodiment, a music call key, a function call key and a photograph call key are provided in addition to the E-mail key 24 as the function keys 23 of the cellular telephone 1. The user presses a function key 23 corresponding to a category that he/she desires to call up after he/she directly enters a numeric string on the standby screen of the cellular telephone 1. For example, a user who desires to search for a piece of music downloaded to the cellular telephone 1 enters a numeric string and then presses the music call key, and a user who desires to call up a function incorporated in the cellular telephone 1 enters a numeric string and then presses the function call key. The processing part 30 searches a registration information database corresponding to the pressed function key 23 to retrieve or extract a piece of registration information associated with numeric data containing the entered numeric string. For example, when the music call key is pressed, the processing part 30 searches the music database 42 to retrieve or extract a piece of registration information (a song title and a music file name) associated with numeric data containing the entered numeric string.

That is, the construction of the cellular telephone 1 according to the sixth preferred embodiment is similar to that according to the first preferred embodiment except that the four registration information databases are provided, and the operational procedure of the cellular telephone 1 according to the sixth preferred embodiment is substantially similar to that shown in FIG. 2. According to the sixth preferred embodiment, however, when the number of pieces of registration information extracted as a result of the search becomes one, the processing part 30 displays the one piece of registration information with a selection parameter regarding the one piece of registration information added thereto on the display 10.

Figure 11:
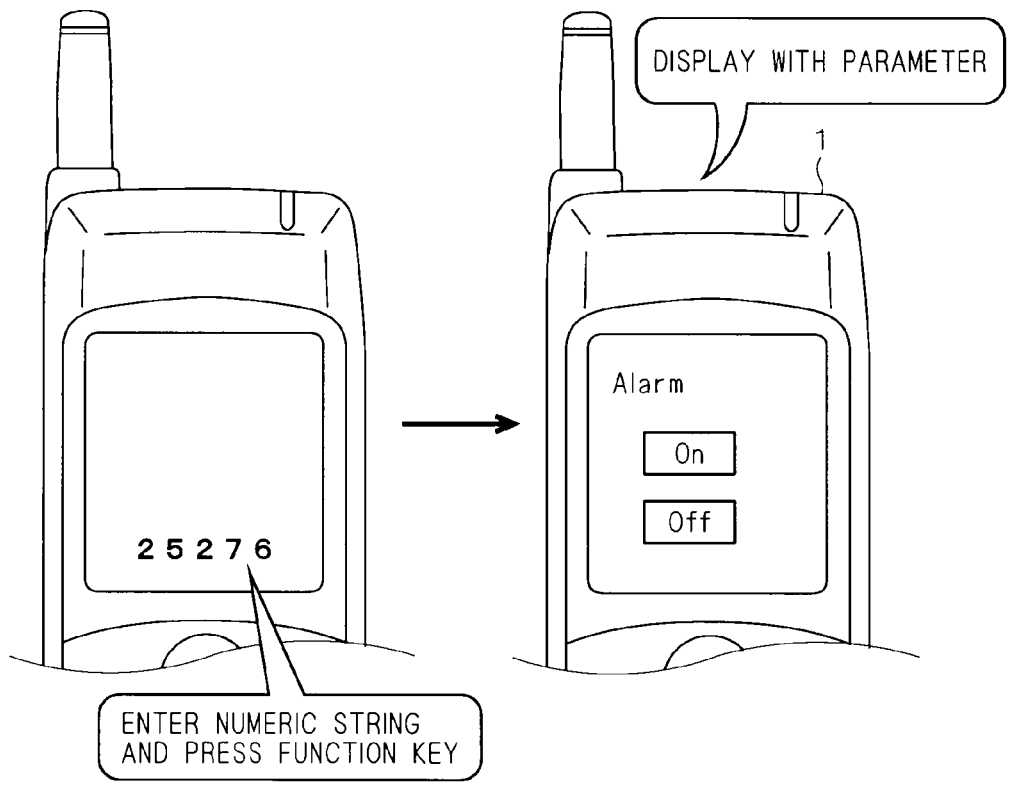
FIG. 11 is a view showing another example of a display transition on the display of the cellular telephone.

For example, as shown in FIG. 11, a user who desires to switch an alarm function enters the numeric string "25276" obtained by numerical conversion of the function name "Alarm" in accordance with the above-mentioned assignment relationship shown in FIG. 5 on the standby screen of the cellular telephone 1, and presses the function call key. Then, the processing part 30 searches the function database 43 to retrieve or extract a piece of registration information (a function name and a file name for execution of the function) associated with numeric data containing the numeric string "25276." As a result, when the number of extracted pieces of registration information is one, that is, when only the alarm function is extracted, the processing part 30 displays "Alarm" which is a result of the search with an on/off parameter which is the selection parameter regarding the alarm function added thereto on the display 10.

This allows more efficient display of pieces of registration information desired by the user, and is very convenient to the user. The addition of the selection parameter is not limited to an instance in which the registration information is the function name. For example, a title of a photograph may be displayed with a selection parameter such as "Delete" and "Transfer" added thereto. Further, the addition of the selection parameter regarding the registration information is not limited to an instance in which the number of extracted pieces of registration information is one, but may be made in an instance in which the number of extracted pieces of registration information is not greater than a predetermined number.

<7. Seventh Preferred Embodiment>

Next, a seventh preferred embodiment according to the present invention will be described. The construction of the cellular telephone according to the seventh preferred embodiment is substantially identical with that according to the sixth preferred embodiment shown in FIG. 10. Specifically, the four registration information databases, i.e. the address book database 41, the music database 42, the function database 43 and the photograph database 44, are stored in the storage part 40 also in the cellular telephone 1 according to the seventh preferred embodiment. According to the seventh preferred embodiment, however, the individual function keys 23 in a one-to-one correspondence with the four registration information databases are not provided, but only one call key is provided.

When the user enters a predetermined numeric string on the standby screen of the cellular telephone 1 and presses the call key, the processing part 30 individually searches the four registration information databases, i.e. the address book database 41, the music database 42, the function database 43 and the photograph database 44, to retrieve or extract pieces of registration information associated with numeric data containing the numeric string on a category-by-category basis. As a result, there can be cases where pieces of registration information are extracted from the respective categories: "Address Book," "Music," "Function" and "Photograph." In such cases, a category to be preferentially displayed is previously determined according to the seventh preferred embodiment. The processing part 30 displays an extracted piece of registration information which belongs to the previously determined default category on the display 10.

Also, the processing part 30 displays an extracted piece of registration information which belongs to a category different from the above-mentioned default category in response to a predetermined key manipulation (e.g., the manipulation of the direction key 25 of FIG. 4). For example, when the address book is determined as the default category, a piece of registration information extracted from the address book database 41 is first displayed on the display 10. Then, a user who desires to change the category manipulates the direction key 25, whereby pieces of registration information extracted from the music database 42, the function database 43 and the photograph database 44 sequentially appear on the display 10.

This allows more efficient display of pieces of registration information desired by the user, and is very convenient to the user <8. Modifications>

Although the preferred embodiments according to the present invention have been described hereinabove, the present invention is not limited to the above-mentioned examples. In the above-mentioned preferred embodiments, for example, the user directly enters a numeric string obtained by the numerical conversion of a piece of registration information in accordance with the assignment relationship of FIG. 5 on the standby screen of the cellular telephone 1. However, the user may open an information retrieval screen, enter a numeric string obtained by the numerical conversion of a piece of registration information in accordance with the above-mentioned assignment relationship in a search keyword specification field of the information retrieval screen, and then press a predetermined function key. The details of processing executed by the processing part 30 at this time are identical with those of the above-mentioned preferred embodiments.

Further, the instance in which the registration information in the cellular telephone 1 is called up has been described in the above-mentioned preferred embodiments. The present invention, however, is not limited to such an instance. The present invention as described above is applicable to a personal digital assistant provided with at least numerical keys.

The invention claimed is:

1. A cellular telephone which calls up registration information to display the registration information on a display part,
there being an assignment relationship established between each numerical key included among dial keys of the cellular telephone and a plurality of single characters,
said cellular telephone comprising:
a storage part for storing a database in which numeric data obtained by numerical conversion of a piece of registration information in accordance with said assignment relationship and said piece of registration information are associated with each other;
an acceptance part for accepting a numeric string entered by using said dial keys as a call request for a predetermined piece of registration information;
an extraction part for searching said database to extract pieces of registration information associated with numeric data containing said numeric string;
a sorting part for rearranging an exactly matching one of the pieces of registration information extracted by said extraction part in a high rank; and
a display control part for controlling said display part so as to display the pieces of registration information extracted by said extraction part in the order rearranged by said sorting part,
wherein said sorting part places an exactly matching one of the pieces of registration information extracted by said extraction part in a first rank, places a prefix-matching one thereof in a second rank, and places a partially matching one thereof in a third rank.

2. A cellular telephone which calls up registration information to display the registration information on a display part,
there being an assignment relationship established between each numerical key included among dial keys of the cellular telephone and a plurality of single characters,
said cellular telephone comprising:
a first storage part for storing a database in which numeric data obtained by numerical conversion of a piece of registration information in accordance with said assignment relationship and said piece of registration information are associated with each other;
an acceptance part for accepting a numeric string entered by using said dial keys as a call request for a predetermined piece of registration information;
an extraction part for searching said database to extract pieces of registration information associated with numeric data containing said numeric string;
a second storage part for storing the number of times a user selected a piece of registration information in the past as frequency information;
a sorting part for rearranging at least one of the pieces of registration information extracted by said extraction part which was selected in the past in a high rank by referencing said frequency information; and
a display control part for controlling said display part so as to display the pieces of registration information extracted by said extraction part in the order rearranged by said sorting part,
wherein said sorting part places an exactly matching one of the pieces of registration information extracted by said extraction part in a first rank, places a prefix-matching one thereof in a second rank, and places a partially matching one thereof in a third rank.

3. The cellular telephone according to claim 2, wherein said sorting part rearranges at least one of the pieces of registration information extracted by said extraction part which was selected a greater number of times in the past in a higher rank.

4. A cellular telephone which calls up registration information to display the registration information on a display part,
there being an assignment relationship established between each numerical key included among dial keys of the cellular telephone and a plurality of single characters,
said cellular telephone comprising:
a storage part for storing a database in which numeric data obtained by numerical conversion of a piece of registration information in accordance with said assignment relationship and said piece of registration information are associated with each other;
an acceptance part for accepting a numeric string entered by using said dial keys as a call request for a predetermined piece of registration information;
an extraction part for searching said database to extract pieces of registration information associated with numeric data containing said numeric string; and
a display control part for displaying the pieces of registration information extracted by said extraction part on said display part,
wherein said acceptance part accepts the entry of a numeric string including a wild card, and
wherein a sorting part is configured to place an exactly matching one of the pieces of registration information extracted by said extraction part in a first rank, places a prefix-matching one thereof in a second rank, and places a partially matching one thereof in a third rank.

5. A cellular telephone which calls up registration information to display the registration information on a display part,
there being an assignment relationship established between each numerical key included among dial keys of the cellular telephone and a plurality of single characters,
said cellular telephone comprising:
a storage part for storing a database in which numeric data obtained by numerical conversion of a piece of registration information in accordance with said assignment relationship and said piece of registration information are associated with each other;
an acceptance part for accepting a numeric string entered by using said dial keys as a call request for a predetermined piece of registration information;
an extraction part for searching said database to extract pieces of registration information associated with numeric data containing said numeric string; and
a display control part for displaying the pieces of registration information extracted by said extraction part on said display part, wherein numeric data including a character delimiter corresponding to a blank character contained in a piece of registration information is registered in said database, wherein said extraction part performs a prefix search also on numeric data subsequent to the character delimiter, and wherein a sorting part is configured to place an exactly matching one of the pieces of registration information extracted by said extraction part in a first rank, places a prefix-matching one thereof in a second rank, and places a partially matching one thereof in a third rank.

6. A cellular telephone which calls up registration information to display the registration information on a display part, there being an assignment relationship established between each numerical key included among dial keys of the cellular telephone and a plurality of single characters, said cellular telephone comprising:

a storage part for storing a database in which numeric data obtained by numerical conversion of a piece of registration information in accordance with said assignment relationship and said piece of registration information are associated with each other;

an acceptance part for accepting a numeric string entered by using said dial keys as a call request for a predetermined piece of registration information;

an extraction part for searching said database to extract pieces of registration information associated with numeric data containing said numeric string; and a display control part for controlling said display part so that when the number of pieces of registration information extracted by said extraction part is not greater than a predetermined number, one or each piece of registration information extracted by said extraction part is displayed on said display part with a selection parameter regarding the one or each extracted piece of registration information added thereto, wherein a sorting part is configured to place an exactly matching one of the pieces of registration information extracted by said extraction part in a first rank, places a prefix-matching one thereof in a second rank, and places a partially matching one thereof in a third rank.

7. A cellular telephone which calls up registration information to display the registration information on a display part, there being an assignment relationship established between each numerical key included among dial keys of the cellular telephone and a plurality of single characters, said cellular telephone comprising:

a storage part for storing a database in which numeric data obtained by numerical conversion of a piece of registration information in accordance with said assignment relationship and said piece of registration information are associated with each other;

an acceptance part for accepting a numeric string entered by using said dial keys as a call request for a predetermined piece of registration information;

an extraction part for searching said database to extract pieces of registration information associated with numeric data containing said numeric string on a category-by-category basis; and a display control part for controlling said display part so as to display at least one of the pieces of registration information extracted by said extraction part which belongs to a previously determined default category, and so as to display at least one of the pieces of registration information extracted by said extraction part which belongs to a category different from said default category in response to a predetermined key manipulation, wherein a sorting part is configured to place an exactly matching one of the pieces of registration information extracted by said extraction part in a first rank, places a prefix-matching one thereof in a second rank, and places a partially matching one thereof in a third rank.

* * * * *